United States Patent
Lai et al.

(10) Patent No.: US 8,899,123 B2
(45) Date of Patent: Dec. 2, 2014

(54) GEAR TRANSMISSION DEVICE WITH RESILIENT CONNECTION BETWEEN DRIVING GEAR AND DRIVING SHAFT

(75) Inventors: Cheng-Yi Lai, New Taipei (TW); Tzu-Hsiu Hung, New Taipei (TW)

(73) Assignee: Hon Hai Precision Industry Co., Ltd., New Taipei (TW)

( * ) Notice: Subject to any disclaimer, the term of this patent is extended or adjusted under 35 U.S.C. 154(b) by 404 days.

(21) Appl. No.: 13/327,781

(22) Filed: Dec. 16, 2011

(65) Prior Publication Data
US 2013/0074624 A1   Mar. 28, 2013

(30) Foreign Application Priority Data
Sep. 27, 2011   (TW) .............................. 100134712 A

(51) Int. Cl.
*F16H 57/00* (2012.01)
*F16H 55/14* (2006.01)
*F16H 55/08* (2006.01)
*F16H 61/04* (2006.01)

(52) U.S. Cl.
CPC ............ *F16H 55/14* (2013.01); *F16H 55/0873* (2013.01); *F16H 2061/047* (2013.01)
USPC .............................................. 74/411; 74/409

(58) Field of Classification Search
CPC ......... F16H 57/12; F16H 55/14; F16H 55/18; F16H 55/26; F16H 55/283
USPC ....................... 74/409, 411, 422, 89.18, 89.17
See application file for complete search history.

(56) References Cited

U.S. PATENT DOCUMENTS

| | | | | | |
|---|---|---|---|---|---|
| 3,789,690 | A | * | 2/1974 | Droske | 74/411 |
| 5,109,723 | A | * | 5/1992 | Kato | 74/411 |
| 5,943,913 | A | * | 8/1999 | Fenelon | 74/411 |
| 6,293,166 | B1 | * | 9/2001 | Genter et al. | 74/440 |
| 7,228,752 | B2 | * | 6/2007 | Tang et al. | 74/411 |
| 7,334,553 | B2 | * | 2/2008 | Satoh et al. | 123/192.2 |
| 7,752,937 | B1 | * | 7/2010 | Dornan | 74/409 |
| 7,926,385 | B2 | * | 4/2011 | Papanikolaou et al. | 74/530 |
| 2002/0000135 | A1 | * | 1/2002 | Zaps | 74/411 |
| 2005/0229728 | A1 | * | 10/2005 | Otsuki | 74/6 |

(Continued)

FOREIGN PATENT DOCUMENTS

| | | |
|---|---|---|
| CN | 100384673 | 4/2008 |
| JP | 5853945 | 4/1983 |

(Continued)

*Primary Examiner* — Troy Chambers
*Assistant Examiner* — Alexander Vu
(74) *Attorney, Agent, or Firm* — Novak Druce Connolly Bove + Quigg LLP

(57) ABSTRACT

An exemplary gear transmission device includes a driving assembly including a driving shaft, a shaft coupling, a circular driving gear, a resilient mechanism and a driven gear engaging with the driving gear. The shaft coupling is fixed to the driving shaft and rotatable in unison with rotation of the driving shaft. The circular driving gear substantially surrounds and is operatively coupled to the shaft coupling and rotatable under urging of the shaft coupling. The resilient mechanism is held between the driving gear and the shaft coupling and is elastically deformable in circumferential directions of the shaft coupling. When the driving gear moves axially and collides with the driven gear without meshing with the driven gear, the driving gear rotates slightly relative to the shaft coupling thereby elastically deforming the resilient mechanism and the driving gear reaches a position where it can mesh with the driven gear.

15 Claims, 8 Drawing Sheets

(56) References Cited

U.S. PATENT DOCUMENTS

| | | | |
|---|---|---|---|
| 2006/0191365 A1* | 8/2006 | Stierle et al. | 74/411 |
| 2006/0196287 A1* | 9/2006 | Walters | 74/411 |
| 2010/0252390 A1* | 10/2010 | George | 192/70.17 |

FOREIGN PATENT DOCUMENTS

| | | |
|---|---|---|
| JP | 2142953 | 6/1990 |
| JP | 2001116116 | 4/2001 |
| JP | 2005273798 | 10/2005 |

* cited by examiner

GEAR TRANSMISSION DEVICE WITH RESILIENT CONNECTION BETWEEN DRIVING GEAR AND DRIVING SHAFT

BACKGROUND

1. Technical Field

The present disclosure generally relates to gear transmission devices, and particularly to a gear transmission device with a resilient connection between a driving gear and a driving shaft.

2. Description of Related Art

In order to adjust a camera of a video capturing device such as a video camera or camcorder, a driving gear of the video capturing device moves along a driving shaft of a driving assembly to engage with one or more driven gears. Generally, the driving gear is fixed to the driving shaft of the driving assembly, so that the driving gear cannot rotate relative to the driving shaft. When the driving gear engages with one of the driven gears, teeth of the driving gear are prone to interfere with teeth of the driven gear, which leads to the teeth of the driving gear striking against the teeth of the driven gear and can result in the teeth of the driving gear and/or the driven gear getting damaged or even destroyed.

Therefore, a need exists in the industry to overcome the described problems.

BRIEF DESCRIPTION OF THE DRAWINGS

Many aspects of the present embodiments can be better understood with reference to the following drawings. The components in the drawings are not necessarily drawn to scale, the emphasis instead being placed upon clearly illustrating the principles of the present embodiments. Moreover, in the drawings, all the views are schematic, and like reference numerals designate corresponding parts throughout the several views.

DETAILED DESCRIPTION

Figure 1:
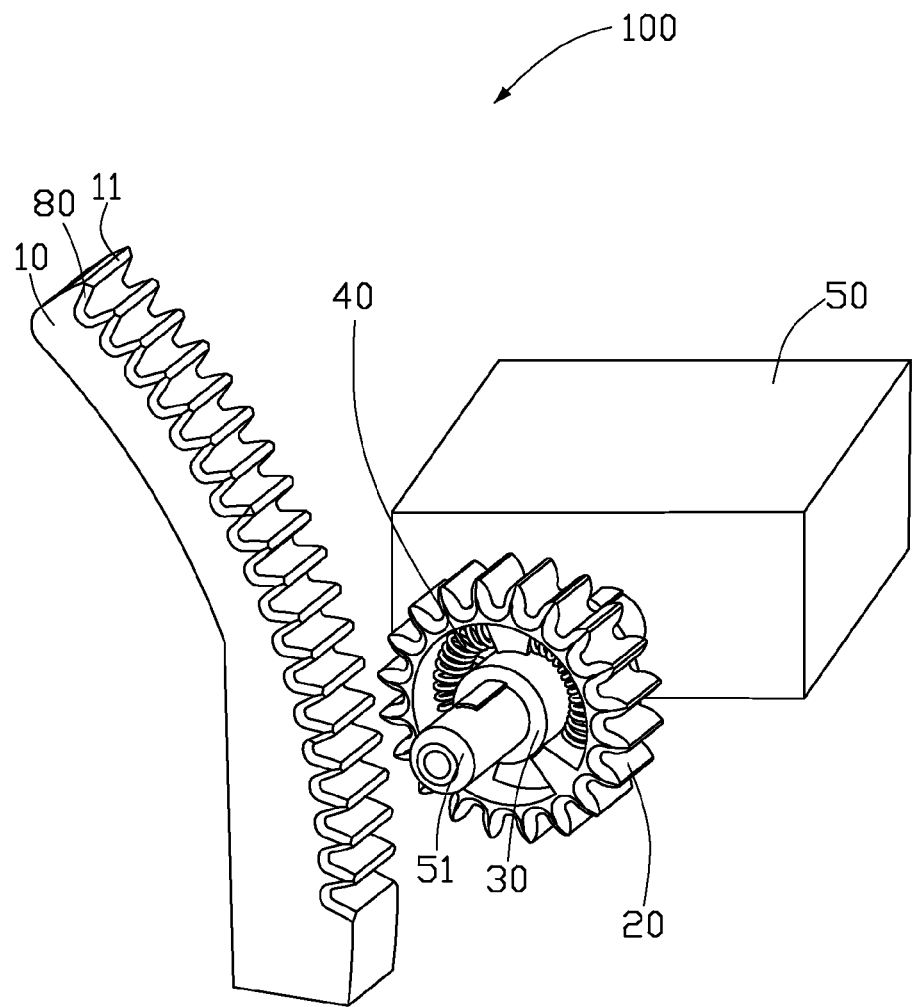
FIG. 1 is a perspective view of a gear transmission device of an exemplary embodiment of the disclosure.

The disclosure is illustrated by way of example and not by way of limitation in the figures of the accompanying drawings, in which like reference numerals indicate similar elements. It should be noted that references to "an" or "one" embodiment in this disclosure are not necessarily to the same embodiment, and such references can mean "at least one" embodiment.

Figure 2:
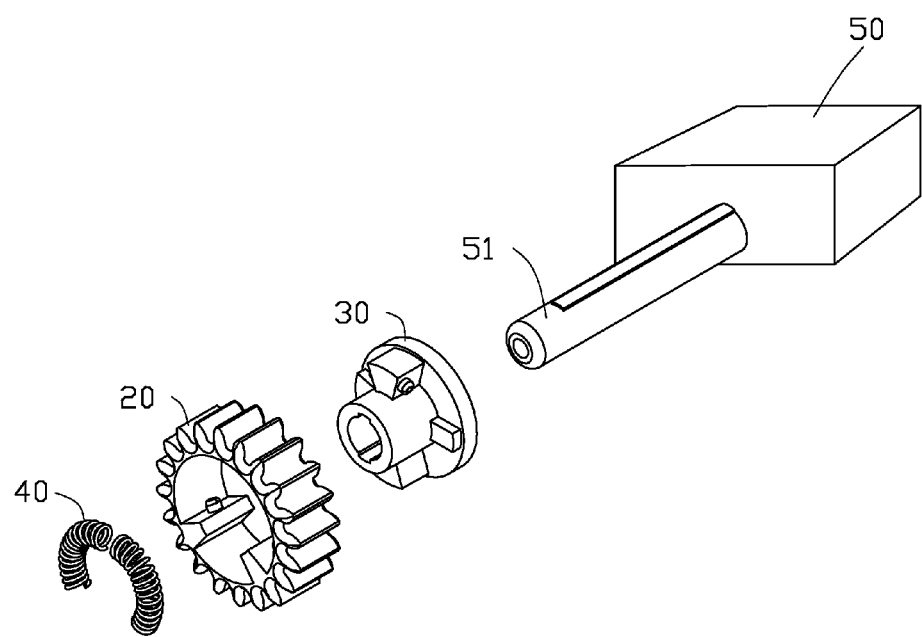
FIG. 2 is a disassembled view of the gear transmission device of FIG. 1, but not showing a driven gear thereof.

With reference to FIGS. 1-2, a gear transmission device 100 comprises a driving assembly 50 configured with a driving shaft 51, a shaft coupling 30 secured to the driving shaft 51, a circular driving gear 20 positioned around the shaft coupling 30, a resilient mechanism 40 urged between the shaft coupling 30 and the driving gear 20, and an arc-shaped driven gear 10. The driving assembly 50 drives the driving gear 20 to move axially along the driving shaft 51 to engage with or disengage from the driven gear 10, and drives the driving gear 20 to rotate and thus cause the driven gear 10 to move. The driving gear 20 comprises a plurality driving teeth 23, and the driven gear 10 comprises a plurality of driven teeth 11. When one of the driving teeth 23 contacts one of the driven teeth 11, a resisting force generated between the driving teeth 23 and the driven teeth 11 compels the driving gear 20 to rotate a tiny angle relative to the shaft coupling 30. As a result, the driving teeth 23 of the driving gear 20 do not strike against the driven teeth 11 of the driven gear 10, and the driving gear 20 meshes with the driven gear 10 smoothly.

Figure 3:
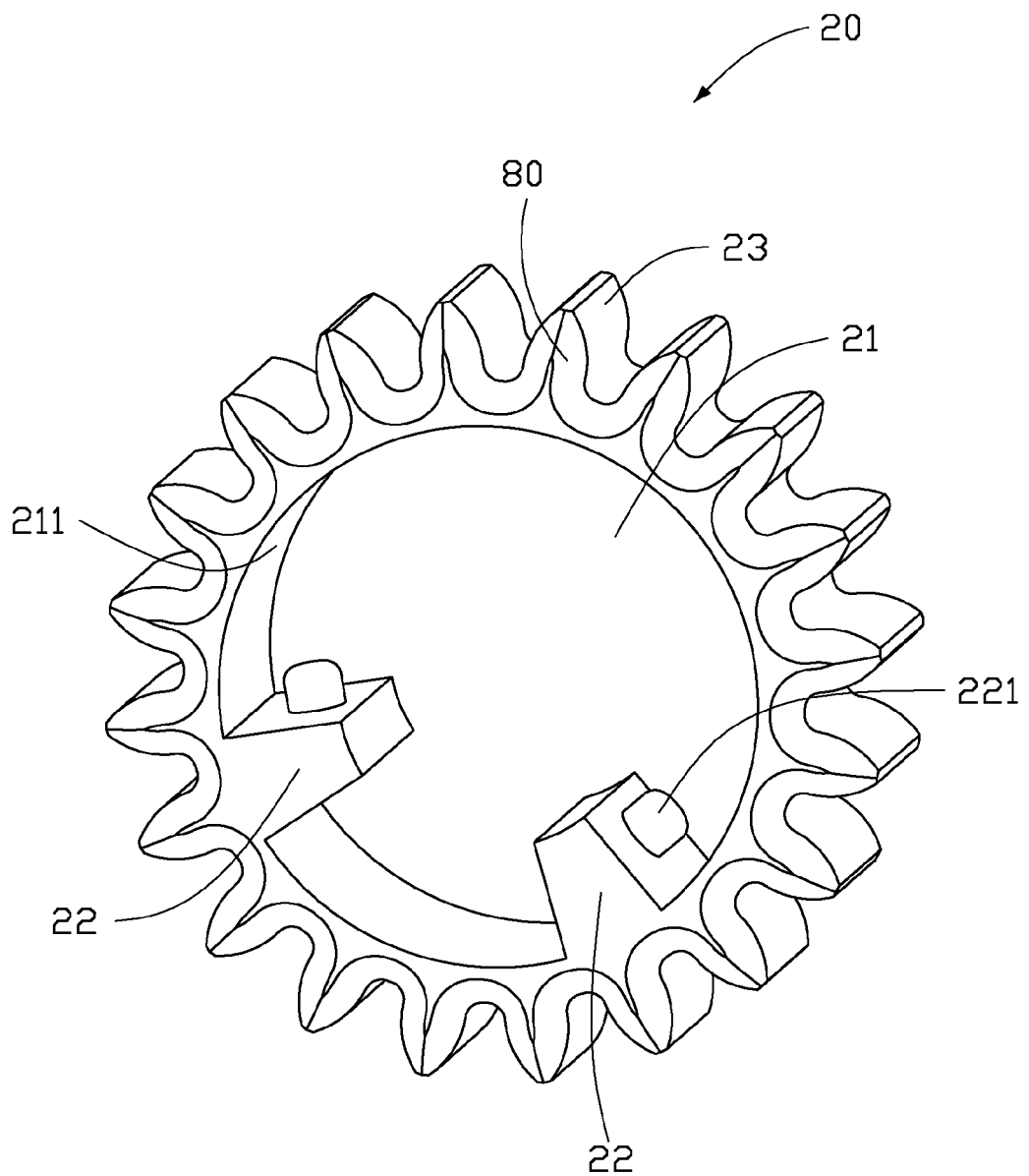
FIG. 3 is an enlarged, perspective view of a driving gear of the gear transmission device of FIG. 2.

With reference to FIG. 3 also, the driving gear 20 defines a hole 21 and comprises a pair of first positioning keys 22 respectively projecting from an inner surface 211 of the hole 21 toward a center of the hole 21. In the embodiment, each of two opposite ends of each of the driving teeth 23 of the driving gear 20 comprises two half-portions of two corresponding chamfer edges 80. That is, each of a plurality of the chamfer edges 80 is generally U-shaped, and forms one end of portions of two consecutive driving teeth 23. Correspondingly, each of two opposite ends of each of the driven teeth 11 of the driven gear 10 comprises two half-portions of two corresponding chamfer edges 80, as shown in FIG. 1. That is, each of a plurality of the chamfer edges 80 is generally U-shaped, and forms one end of portions of two consecutive driven teeth 11.

Figure 4:
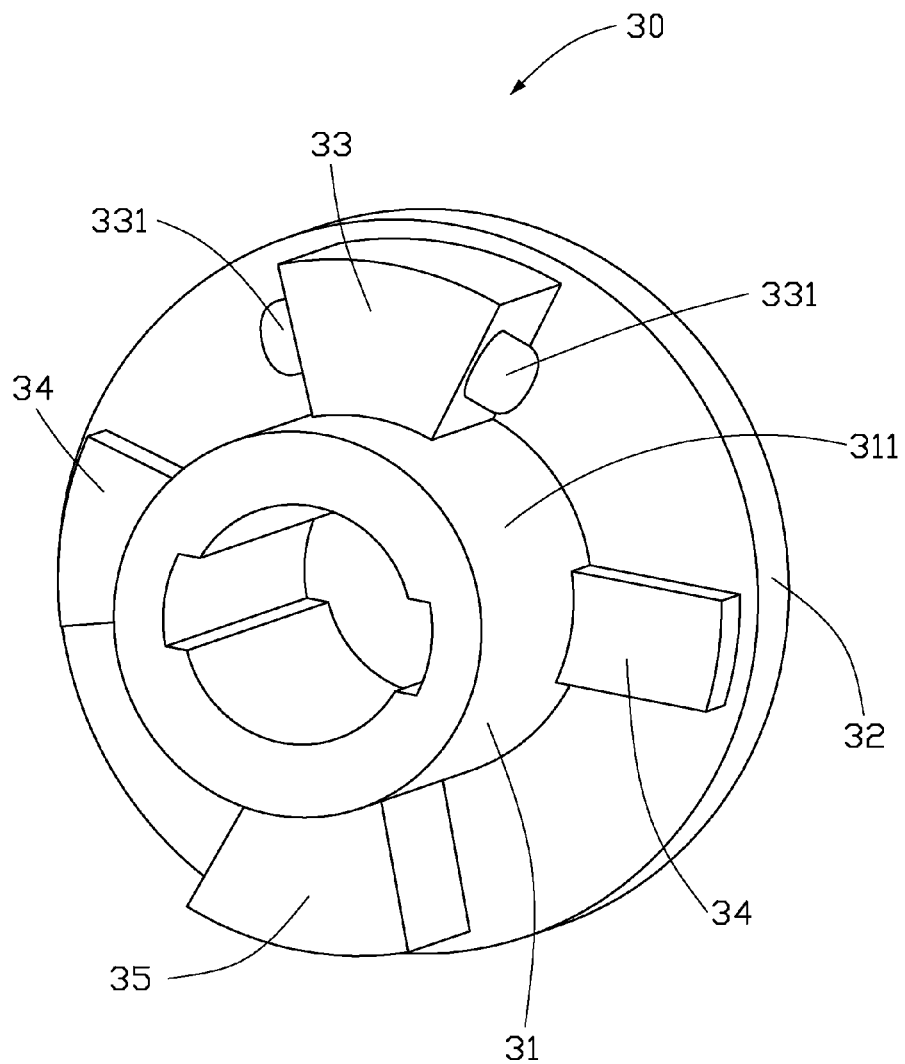
FIG. 4 is an enlarged, perspective view of a shaft coupling of the gear transmission device of FIG. 2.

With reference to FIG. 4, the shaft coupling 30 comprises a body 31 substantially in a shape of a hollow column (or hollow cylinder), a flange 32 located on one end of the body 31, a second positioning key 33 projecting from an exterior surface 311 of the body 31, and a stopper key 35 projecting from the exterior surface 311 of the body 31 and being opposite to the second positioning key 33. In the embodiment, the flange 32 is substantially in the shape of a disk (or annulus) and has a common center with the body 31. The stopper key 35 and the second positioning key 33 are located on a common diameter of the body 31, at opposite sides of the exterior surface 311.

In the embodiment, the shaft coupling 30 further comprises a pair of third positioning keys 34 respectively projecting from the exterior surface 311 of the body 31 and being opposite to each other. In assembly, the pair of third positioning keys 34 are respectively received in the hole 21 of the driving gear 20, and abut the inner surface 211 of the hole 21. This ensures stable radial positioning between the shaft coupling 30 and the driving gear 20.

Figure 5:
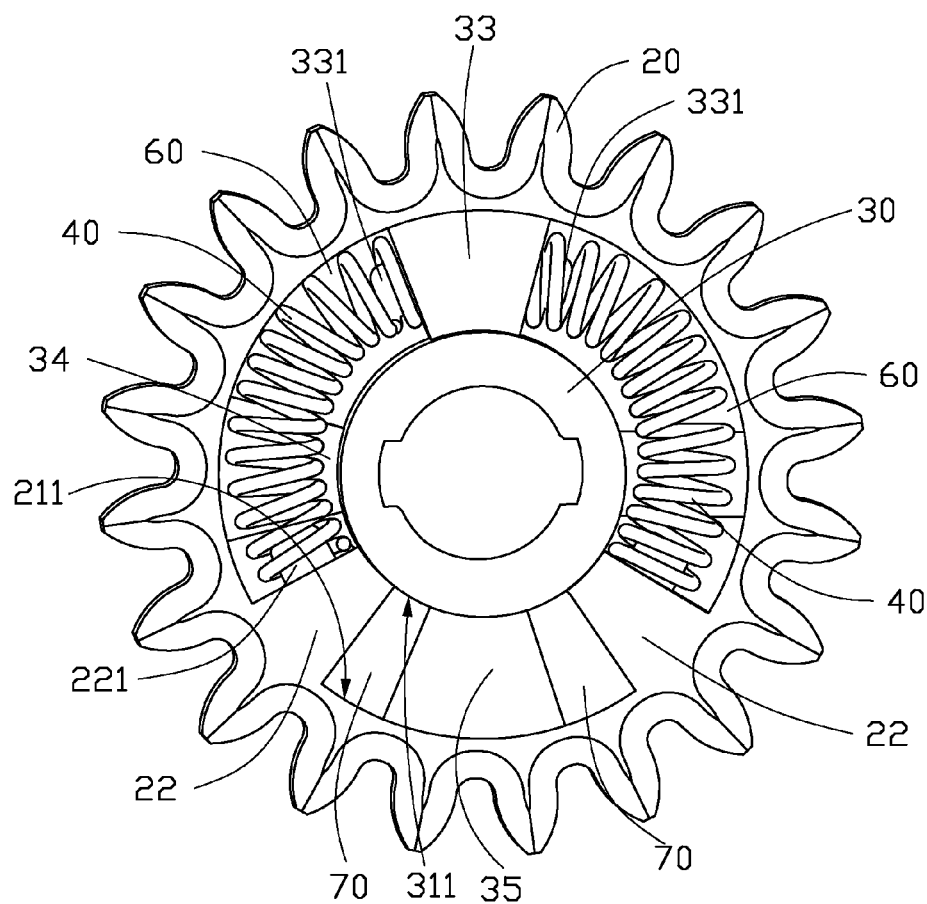
FIG. 5 is an enlarged, assembled, front plan view of the driving gear, the shaft coupling and a resilient mechanism of FIG. 2, showing the resilient mechanism comprising a pair of bent, cylindrical helical springs.

With reference to FIG. 5 also, in the embodiment, the resilient mechanism 40 is a pair of bent, cylindrical helical springs. The driving gear 20 comprises a pair of first securing posts 221 respectively projecting from the pair of first positioning keys 22, as shown in FIG. 3. Correspondingly, the shaft coupling 30 comprises a pair of second securing posts 331 projecting from two sides of the second positioning key 33, as shown in FIG. 3. In assembly, the pair of cylindrical helical springs are bent and respectively received between the pair of first positioning keys 22 and the second positioning key 33. Two ends of each bent, cylindrical helical spring are respectively coiled around a corresponding first securing post 221 and a corresponding second securing post 331, as shown in FIG. 5.

In assembly of the gear transmission device 100, the shaft coupling 30 is received in the hole 21 of the driving gear 20. The pair of first positioning keys 22 respectively abut the exterior surface 311 of the body 31 of the shaft coupling 30. The second positioning key 33 and the stopper key 35 of the shaft coupling 30 respectively abut the inner surface 211 of the hole 21 of the driving gear 20. The flange 32 is stopped on one end of the driving gear 20. With this assembled structure, a pair of arc-shaped positioning slots 60 are defined between the second positioning key 33 and the pair of the first positioning keys 22. The pair of third positioning keys 34 are respectively received in the pair of positioning slots 60. The resilient mechanism 40 is received in the pair of positioning slots 60. That is, the pair of cylindrical helical springs are bent and respectively received in the pair of positioning slots 60, and are urged between the pair of first positioning keys 22 of the driving gear 20 and the second positioning key 33 of the shaft coupling 30, respectively. At same time, a pair of rotating gaps 70 are defined between the stopper key 35 and the pair of the first positioning keys 22. Thereby, the driving gear 20 is elastically connected with the shaft coupling 30 along the circumferential direction, and spaces (i.e. circumferential widths) of the pair of rotating gaps 70 are held constant and cannot change without the application of an external force. The driving shaft 51 of the driving assembly 50 is inserted though the shaft coupling 30 and engages with the shaft coupling 30 firmly.

Figure 6:
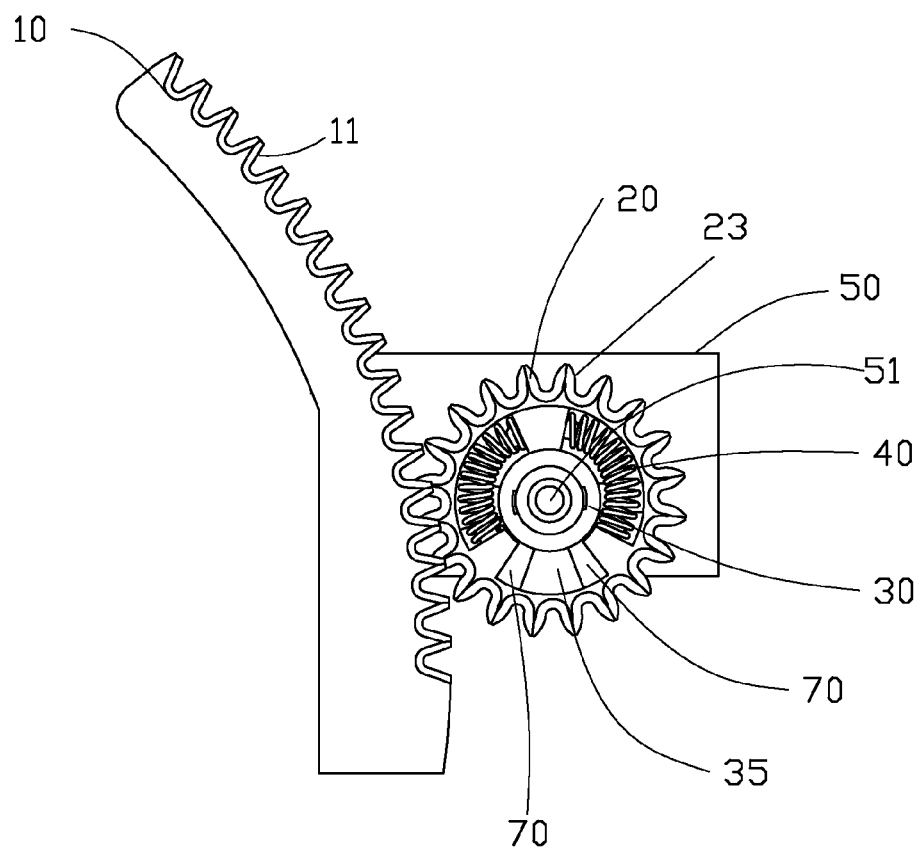
FIG. 6 is a front plan view of the gear transmission device of FIG. 1, showing a state before engagement of the driving gear and the driven gear.
Figure 7:
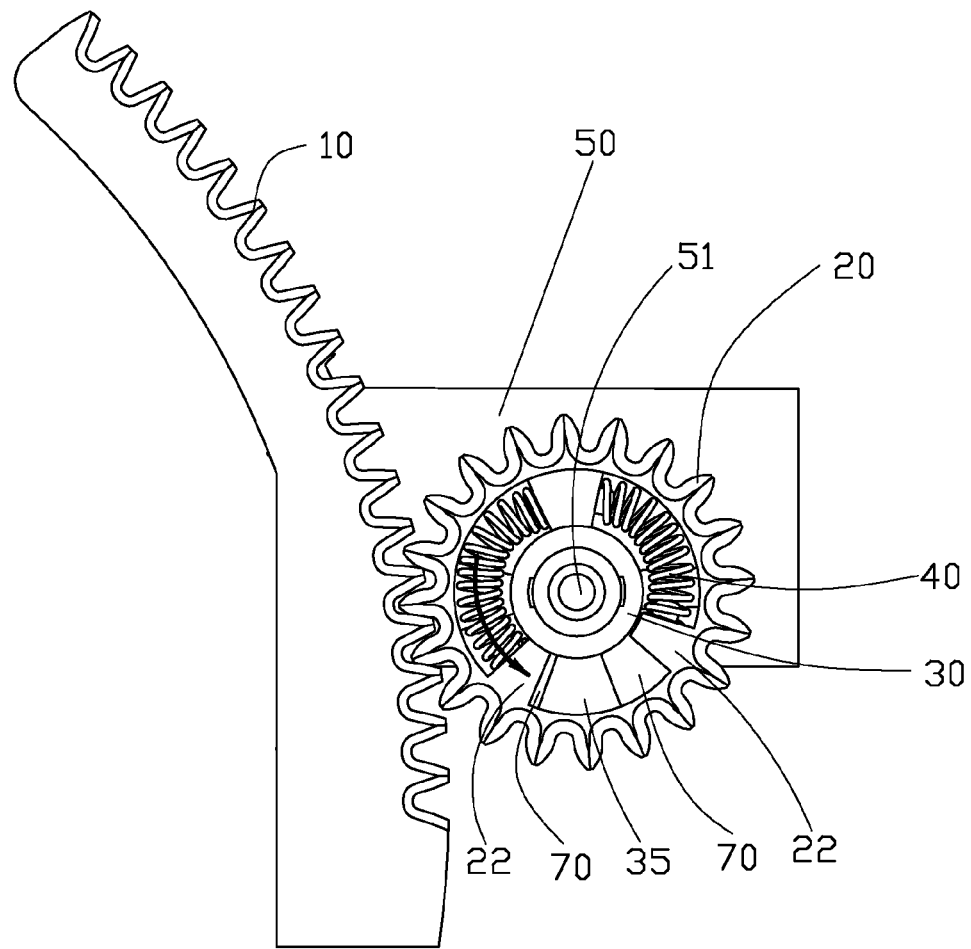
FIG. 7 is similar to FIG. 6, but showing a counterclockwise engagement state of the driving gear and the driven gear, with the driving gear having rotated counterclockwise relative to the shaft coupling to become engaged with the driven gear.
Figure 8:
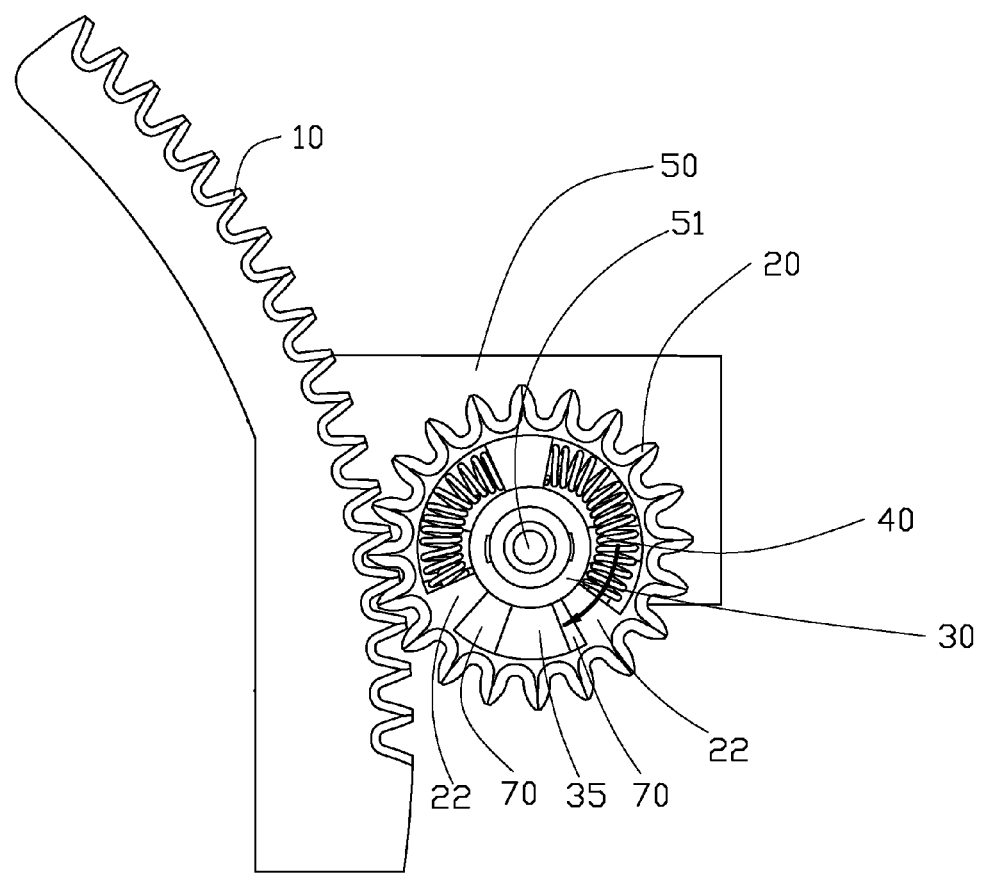
FIG. 8 is similar to FIG. 6, but showing a clockwise engagement state of the driving gear and the driven gear, with the driving gear having rotated clockwise relative to the shaft coupling to become engaged with the driven gear.

With reference to FIGS. 6-8, in use, the driving assembly 50 drives the driving shaft 51 to move axially, and thus drives the shaft coupling 30 and the driving gear 20 to move along an axis of the driving shaft 51 so that the driving gear 20 can engage with the driven gear 10. When the driving teeth 23 of the driving gear 20 contact the driven teeth 11 of the driven gear 10, the resisting force generated between the driving teeth 23 and the driven teeth 11 enables the driving gear 20 to rotate a tiny angle relative to the shaft coupling 30, due to the existence of the pair of rotating gaps 70, which leads to the driving gear 20 meshing with the driven gear 10 easily and smoothly.

In detail, if the driving assembly 50 drives the driving gear 20 to counterclockwise engage with the driven gear 10, as shown in FIG. 7, the driving assembly 50 drives the shaft coupling 30 and the driving gear 20 to move along the axial direction thereof; then when some of the driving teeth 23 of the driving gear 20 contact some of the driven teeth 11 of the driven gear 10, the resisting force generated between the driving teeth 23 of the driving gear 20 and the driven teeth 11 of the driven gear 10 compels the driving gear 20 to overcome the elasticity of the resilient mechanism 40 and rotate the tiny angle counterclockwise. In this process, a rearward one of the pair of rotating gaps 70 closes up somewhat, and a forward one of the pair of rotating gaps 70 opens somewhat. As shown in FIG. 7, the rearward one of the rotating gaps 70 is nearer to the driven gear 10, and the forward one of the rotating gaps 70 is farther away from the driven gear 10. As a result, the driving teeth 23 of the driving gear 20 counterclockwise engage with the driven teeth 11 of the driven gear 10. Subsequently, the shaft coupling 30 rotates counterclockwise to cause the stopper key 35 of the shaft coupling 30 to move relative to the driving gear 20 in the forward rotating gap 70. When the stopper key 35 resists the corresponding forward one of the first positioning keys 22 of the driving gear 20 neighboring the forward rotating gap 70, the shaft coupling 30 continues to rotate to make the driving gear 20 rotate correspondingly.

If the driving assembly 50 drives the driving gear 20 to clockwise engage with the driven gear 10, as shown in FIG. 8, when some of the driving teeth 23 of the driving gear 20 contact some of the driven teeth 11 of the driven gear 10, the resisting force generated between the driving teeth 23 of the driving gear 20 and the driven teeth 11 of the driven gear 10 compels the driving gear 20 to overcome the elasticity of the resilient mechanism 40 and rotate the tiny angle clockwise. In this process, a rearward one of the pair of rotating gaps 70 closes up somewhat, and a forward one of the pair of rotating gaps 70 opens somewhat. As shown in FIG. 8, the rearward one of the rotating gaps 70 is farther away from the driven gear 10, and the forward one of the rotating gaps 70 is nearer to the driven gear 10. As a result, the driving teeth 23 of the driving gear 20 clockwise engage with the driven teeth 11 of the driven gear 10. Subsequently, the shaft coupling 30 rotates clockwise to cause the stopper key 35 of the shaft coupling 30 to move relative to the driving gear 20 in the forward rotating gap 70. When the stopper key 35 resists the corresponding forward one of the first positioning keys 22 of the driving gear 20 neighboring the forward rotating gap 70, the shaft coupling 30 continues to rotate to make the driving gear 20 rotate correspondingly.

In the embodiment, when no external force is applied on the driving gear 20, the size (i.e. circumferential width) of each of the pair of rotating gaps 70 is greater than half a thickness of any one of the driving teeth 23 of the driving gear 20. This ensures that the driving gear 20 is capable of rotating the tiny angle relative to the shaft coupling 30 to mesh with the driven gear 10 successfully.

Although the features and elements of the present disclosure are described as embodiments in particular combinations, each feature or element can be used alone or in other various combinations within the principles of the present disclosure to the full extent indicated by the broad general meaning of the terms in which the appended claims are expressed.

What is claimed is:

1. A gear transmission device, comprising:
   a driven gear;
   a driving gear in the form of a toothed wheel having a hole in a middle thereof, the driving gear comprising a pair of first positioning keys and a pair of first securing posts respectively projecting from the pair of first positioning keys;
   a shaft coupling received in the hole, the shaft coupling comprising a second positioning key abutting the inner surface of the driving gear and a pair of second securing posts projecting from two sides of the second positioning key;
   a resilient mechanism coiled around a corresponding first securing post and a corresponding second securing post to urge urged between the driving gear and the shaft coupling; and
   a driving assembly operatively coupled to the shaft coupling to drive the driving gear;
   wherein when the shaft coupling drives the driving gear axially to engage with the driven gear and the driving gear contacts the driven gear, a resisting force generated between the driving gear and the driven gear causes the driving gear to rotate a tiny an angle relative to the shaft coupling and further urge the resilient mechanism whereupon the driving gear meshes with the driven gear.

2. The gear transmission device of claim 1, wherein the driving gear comprises a plurality of driving teeth, and each of two opposite ends of each of the driving teeth of the driving gear comprises two chamfer edges.

3. The gear transmission device of claim 1, wherein the pair of first positioning keys respectively projecting from an inner surface of the driving gear surrounding the hole and abutting the shaft coupling, the shaft coupling comprises a pair of positioning slots are defined between the pair of first positioning keys and the second positioning key, and the resilient mechanism is received in the pair of positioning slots and urged between the pair of first positioning keys and the second positioning key.

4. The gear transmission device of claim 3, wherein the shaft coupling further comprises a stopper key abutting the inner surface, and a pair of rotating gaps are defined between the pair of first positioning keys and the stopper key.

5. The gear transmission device of claim 3, wherein the resilient mechanism comprises a pair of bent, cylindrical helical springs respectively received in the pair of positioning slots, with each of the bent, cylindrical helical springs urged between the second positioning key and a corresponding one of the first positioning keys.

6. A gear transmission device, comprising:
a driven gear;
a driving gear in the form of a toothed wheel having a hole in a middle thereof, the driving gear comprising a pair of first positioning keys and a pair of first securing posts respectively projecting from the pair of first positioning keys;
a shaft coupling received in the hole, the shaft coupling comprising a second positioning key abutting the inner surface of the driving gear and a pair of second securing posts projecting from two sides of the second positioning key;
a resilient mechanism coiled around a corresponding first securing post and a corresponding second securing post to urge between the driving gear and the shaft coupling; and
a driving assembly operatively coupled to the shaft coupling to drive the driving gear;
wherein when the shaft coupling drives the driving gear axially to engage with the driven gear and the driving gear contacts the driven gear, a resisting force generated between the driving gear and the driven gear causes the driving gear to rotate an angle relative to the shaft coupling and further urge the resilient mechanism whereupon the driving gear meshes with the driven gear;
wherein the pair of first positioning keys respectively projecting from an inner surface of the driving gear surrounding the hole and abutting the shaft coupling, the shaft coupling comprises a pair of positioning slots are defined between the pair of first positioning keys and the second positioning key, and the resilient mechanism is received in the pair of positioning slots and urged between the pair of first positioning keys and the second positioning key;
wherein the resilient mechanism comprises a pair of bent, cylindrical helical springs respectively received in the pair of positioning slots, with each of the bent, cylindrical helical springs urged between the second positioning key and a corresponding one of the first positioning keys.

7. The gear transmission device of claim 6, wherein the driving gear comprises a plurality of driving teeth, and each of two opposite ends of each of the driving teeth of the driving gear comprises two chamfer edges.

8. The gear transmission device of claim 6, wherein the shaft coupling further comprises a stopper key abutting the inner surface, and a pair of rotating gaps are defined between the pair of first positioning keys and the stopper key.

9. The gear transmission device of claim 6, wherein the shaft coupling comprises a flange located on one end of the body and abutting one end of the driving gear.

10. The gear transmission device of claim 6, wherein the driven gear is substantially arc-shaped.

11. A gear transmission device, comprising:
a driven gear comprise a plurality of driven teeth;
a circular driving gear defining a hole therein, and comprising:
a plurality of driving teeth; and
a pair of first positioning keys projecting from an inner surface of the driving gear surrounding the hole;
a pair of first securing posts respectively projecting from the pair of first positioning key;
a shaft coupling comprising a body, a second positioning key, a pair of second securing posts projecting from two sides of the second positioning key and a stopper key, both of the second positioning key and the stopper key projecting from an exterior surface of the body, wherein the shaft coupling is received in the hole of the driving gear with the second positioning key and the stopper key respectively abutting the inner surface of the driving gear surrounding the hole, and the pair of the first positioning keys of the driving gear respectively abutting the exterior surface of the body of the shaft coupling, a pair of positioning slots are defined between the pair of first positioning keys and the second positioning key, and a pair of rotating gaps are defined between the pair of first positioning keys and the stopper key;
a resilient mechanism received in the pair of the positioning slots and coiled around a corresponding first securing post and a corresponding second securing post to urge between the pair of first positioning keys and the second positioning key; and
a driving assembly operatively coupled to the shaft coupling for driving the driving gear to engage with the driven gear;
wherein when the shaft coupling drives the driving gear axially to engage with the driven gear and one or more of the driving teeth of the driving gear contact one or more of the driven teeth of the driven gear, a resisting force generated between the driving teeth of the driving gear and the driven teeth of the driven gear compels the driving gear to rotate an angle relative to the shaft coupling and thereby partially close up one of the pair of rotating gaps and further urge the resilient mechanism, whereupon the driving gear meshes with the driven gear smoothly;
wherein the resilient mechanism comprises a pair of bent, cylindrical helical springs respectively received in the pair of positioning slots with each of the bent, cylindrical helical springs urged between the second positioning key and a corresponding one of the first positioning keys.

12. The gear transmission device of claim 11, wherein each of two opposite ends of each of the driving teeth of the driving gear comprises two chamfer edges.

13. The gear transmission device of claim 11, wherein the shaft coupling comprises a flange located on one end of the body and abutting one end of the driving gear.

14. The gear transmission device of claim 11, wherein the shaft coupling comprises a pair of third positioning keys respectively projecting from the exterior surface of the body and received in the positioning slots with the pair of third positioning keys abutting the inner surface.

15. The gear transmission device of claim 11, wherein the driven gear is substantially arc-shaped.

\* \* \* \* \*